(12) United States Patent
Chen et al.

(10) Patent No.: US 7,403,381 B2
(45) Date of Patent: Jul. 22, 2008

(54) MOUNTING DEVICE FOR DATA STORAGE DEVICE

(75) Inventors: Yun-Lung Chen, Taipei Hsien (TW); Qing-Hao Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/686,963

(22) Filed: Mar. 16, 2007

(65) Prior Publication Data

US 2008/0144275 A1 Jun. 19, 2008

(30) Foreign Application Priority Data

Dec. 15, 2006 (CN) .................. 2006 2 0016274

(51) Int. Cl.
*G06F 1/16* (2006.01)
(52) U.S. Cl. .................. 361/685; 360/97.02; 720/710
(58) Field of Classification Search .............. 360/97.01, 360/97.02, 244.1; 257/295; 713/300, 340; 720/706, 710, 735; 361/679–687, 724–727
See application file for complete search history.

(56) References Cited

U.S. PATENT DOCUMENTS

| 5,332,306 | A  | * | 7/1994 | Babb et al. ............. 312/334.16 |
| 6,556,434 | B1 |   | 4/2003 | Chan et al. |
| 7,068,502 | B2 | * | 6/2006 | Chen et al. .................. 361/685 |
| 7,230,824 | B2 | * | 6/2007 | Wei-Chieh et al. .......... 361/685 |

* cited by examiner

*Primary Examiner*—Hung V Duong
(74) *Attorney, Agent, or Firm*—Wei Te Chung

(57) ABSTRACT

A mounting device (30) for a data storage device (80) has at least one retaining hole (81) defined in each one of two opposite sides thereof. The mounting device includes a receiving member (40) and a retaining member (50). The receiving member includes a side wall (43) and a bottom wall (41). At least one fixing pin (433) is formed on the side wall. An elastic clip (415) is formed on the bottom wall with a protrusion (416) formed thereon. The retaining member is slidably attached to the receiving member. The retaining member includes a base wall (51) and a retaining wall (53). At least one fixing pin (533) is formed on the retaining wall. An opening (511) is defined in the base wall corresponding to the protrusion.

20 Claims, 4 Drawing Sheets

MOUNTING DEVICE FOR DATA STORAGE DEVICE

This application is related to co-pending U.S. patent application Ser. No. 11/672,963, filed on Feb. 9, 2007, and entitled "MOUNTING DEVICE FOR DISK DRIVE", and co-pending U.S. patent application Ser. No. 11/672,964, entitled "MOUNTING APPARATUS FOR DATA STORAGE DEVICE", and filed on Feb. 9, 2007. The present application and the co-pending applications are assigned to the same assignee. The disclosures of the above-identified applications are incorporated herein by reference.

BACKGROUND OF THE INVENTION

1. Field of the Invention

The present invention relates to a mounting device, and more particularly to a mounting device for securely and simply retaining a data storage device in a computer enclosure.

2. Description of Related Art

Usually, at least one data storage device is secured in a computer for data storage use. The at least one data storage device is conventionally secured to the computer by a plurality of screws. The screws are small, and when securing or dismounting the data storage device the screws are easily dropped into the computer enclosure, which may result in damage.

Subsequently, some mounting devices for mounting the data storage device without screws are developed. A typical screwless disk drive mounting structure includes a casing, the casing having positioning units disposed in two opposite sidewalls thereof at different elevations, a plurality of carrier plates respectively hooked in the positioning units and adapted for holding disk drives in the casing at different elevations, a plurality of hold-down frames respectively pivoted to the positioning units at one side wall of the casing and adapted for holding down the corresponding disk drives on the carrier plates, and a plurality of locking handles respectively pivoted to the positioning units at one side wall of the casing and adapted for locking the hold-down frames and the disk drives. However, the above described-structure has two disadvantages. First, the mounting structure has many components, each component has a complicated structure, and thus the mounting structure is difficult to manufacture. Second, a large space is needed for rotating out the locking handle of the mounting structure.

What is needed, therefore, is to provide a mounting device for data storage devices, having a simple structure, and is easy to use.

SUMMARY OF THE INVENTION

A mounting device for a data storage device has at least one retaining hole defined in each of two opposite sides thereof. The mounting device includes a receiving member and a retaining member. The receiving member includes a side wall and a bottom wall. At least one fixing pin is formed on the side wall. An elastic clip is formed on the bottom wall with a protrusion formed thereon. The retaining member is slidably attached to the receiving member. The retaining member includes a base wall and a retaining wall. At least one fixing pin is formed on the retaining wall. An opening is defined in the base wall corresponding to the protrusion. When the data storage device is secured via the at least one fixing pin of the retaining wall received in the at least one retaining hole, the protrusion engages with the opening.

Other advantages and novel features of the present invention will become more apparent from the following detailed description of preferred embodiment when taken in conjunction with the accompanying drawings, in which:

DETAILED DESCRIPTION OF THE INVENTION

Figure 1:
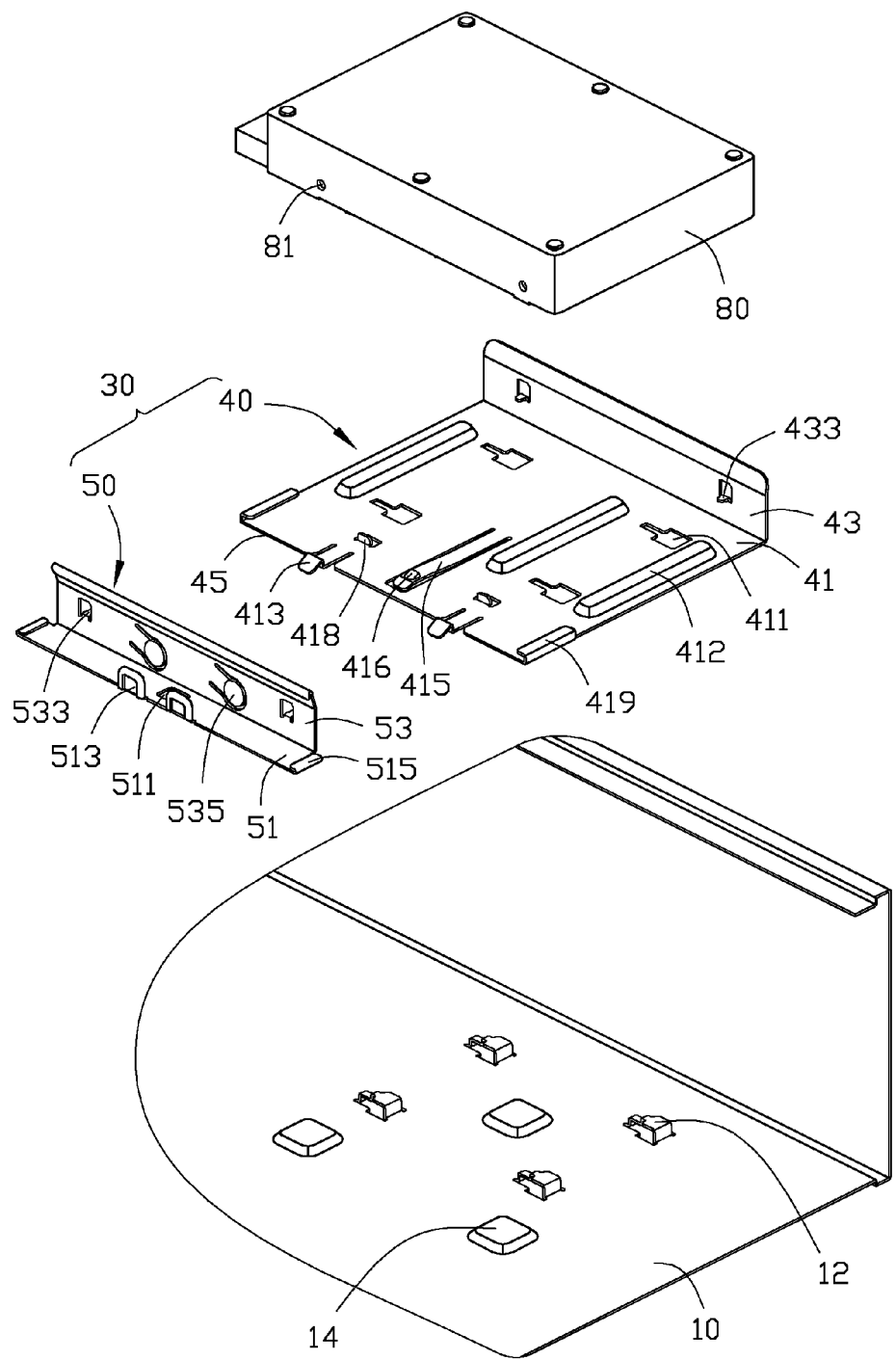
FIG. 1 is an exploded, isometric view of a mounting device for a data storage device according to a preferred embodiment of the present invention, the mounting device secured in a chassis, which is partially shown, includes a receiving member, and a retaining member.

Referring to FIG. 1, a mounting device 30 for a data storage device 80 of the preferred embodiment of the present invention is positioned in a computer chassis 10. The mounting device 30 includes a receiving member 40, and a retaining member 50 slideably attached to the receiving member 40. Two retaining holes 81 are respectively defined at two sides of the data storage device 80.

The chassis 10 has three platforms 14 for supporting the receiving member 40 and four locking feet 12 for holding the receiving member 40. Understandably, the number of the platforms 14 and the locking feet 12 are variable according to design demands.

The receiving member 40 has a bottom wall 41 and a side wall 43 perpendicularly extending up from an edge of the bottom wall 41. A pair of retaining portions is inwardly formed on the side wall 43 corresponding to the retaining holes 81 on a side of the data storage device 80. The retaining portions are termed fixing pins 433 in this preferred embodiment of the present invention. Three spaced positioning bars 412 are formed in parallel on the bottom wall 41 for positioning the data storage device 80 and keeping a distance between the bottom wall 41 and the data storage device 80. Four T-shaped support openings 411 are defined in the bottom wall 41 respectively corresponding to the locking feet 12 of the chassis 10. Each support opening 411 has a wide portion and a narrow portion. The bottom wall 41 has a free edge 45 opposite to the side wall 43. An elastic clip 415 is formed on the bottom wall 41 perpendicular to the free edge 45 with a distal end of the elastic clip 415 adjacent to the free edge 45. A protrusion 416 is formed on the distal end of the elastic clip 415. A pair of lugs 418 is bent up from the bottom wall 41 a distance away from the free edge 45. The height of each lug 418 is smaller than the height of each positioning bar 412. A pair of elastic tongues 413 is formed at the bottom wall 41 and each tongue 413 has a Z-shaped free end extending out from the free edge 45. The ends of the tongues 413 have a slant face for guiding the retaining member 50 to slidably attach to the receiving member 40 and a vertical face configured for abutting the retaining member 50, when the retaining member 50 is attached to the receiving member 40 for preventing the retaining member 50 moving off from the receiving member 40. Two face-to-face U-shaped directing portions 419 are respectively formed at opposite side edges of the bottom wall 41 for further guiding the retaining member 50 sliding to the receiving member 40.

The retaining member 50 has an L shape and includes a base wall 51 and a retaining wall 53 perpendicular to the base wall 51. The retaining wall 53 has a pair of retaining portions corresponding to the retaining holes 81 on another side of the data storage device 80. The retaining portions are termed fixing pins 533 in this preferred embodiment of the present invention. Two wall tabs 535 are formed in the retaining wall 53 for providing grounding contact with the data storage device 80. Two operating tabs 513 are bent up from an outer edge of the base wall 51. A base opening 511 is defined in the base wall 51 for engaging with the protrusion 416 of the receiving member 40. The size of the base opening 511 is preferably larger than the protrusion 416 of the receiving member 40 so that the protrusion 416 can be easily removed from the base opening 511. Opposite ends of the base wall 51 are bent back or rolled back to form two sliding flanges 515 slidable into the directing portions 419 of the receiving member 40.

Figure 2:
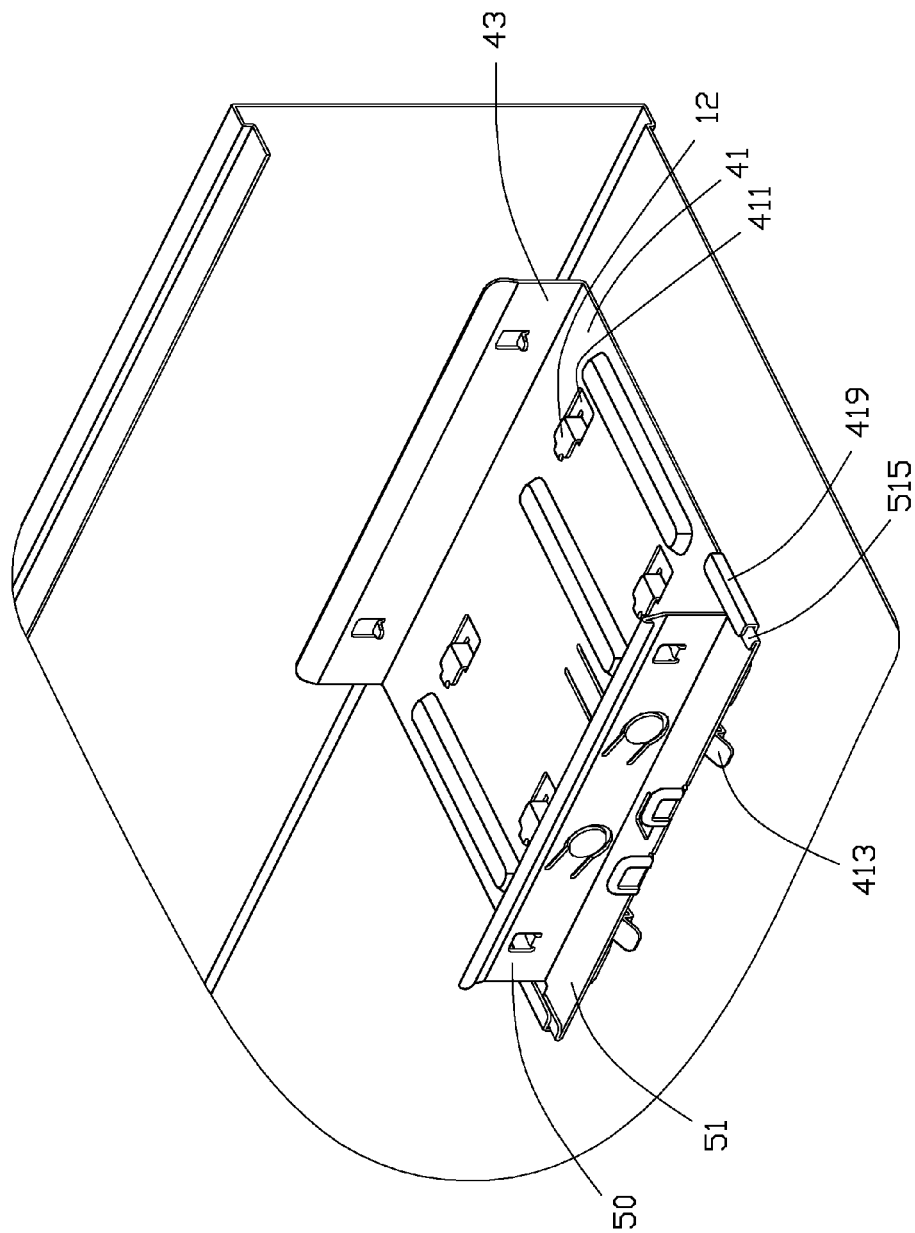
FIG. 2 is an assembled view of the chassis and the mounting device of FIG. 1.

Referring also to FIG. 2, when assembling the mounting device 30, the retaining member 50 is slid into the receiving member 40 with the sliding flanges 515 being directed into the directing portions 419 of the receiving member 40. The tongues 413 are pressed down under the base wall 51 of the retaining member 50. When the retaining member 50 is totally received in the receiving member 40, the tongues 413 rebound and block the retaining member 50 from moving out. The mounting device 30 is then secured in the chassis 10 with each locking foot 12 extending through the wide portion of the corresponding support opening 411 to lock with the narrow portion. The retaining member 50 is movable relative to the side wall 43 to adjust the space between the side wall 43 and the retaining wall 53. The lugs 418 can restrict the movement of the retaining member 50.

Figure 3:
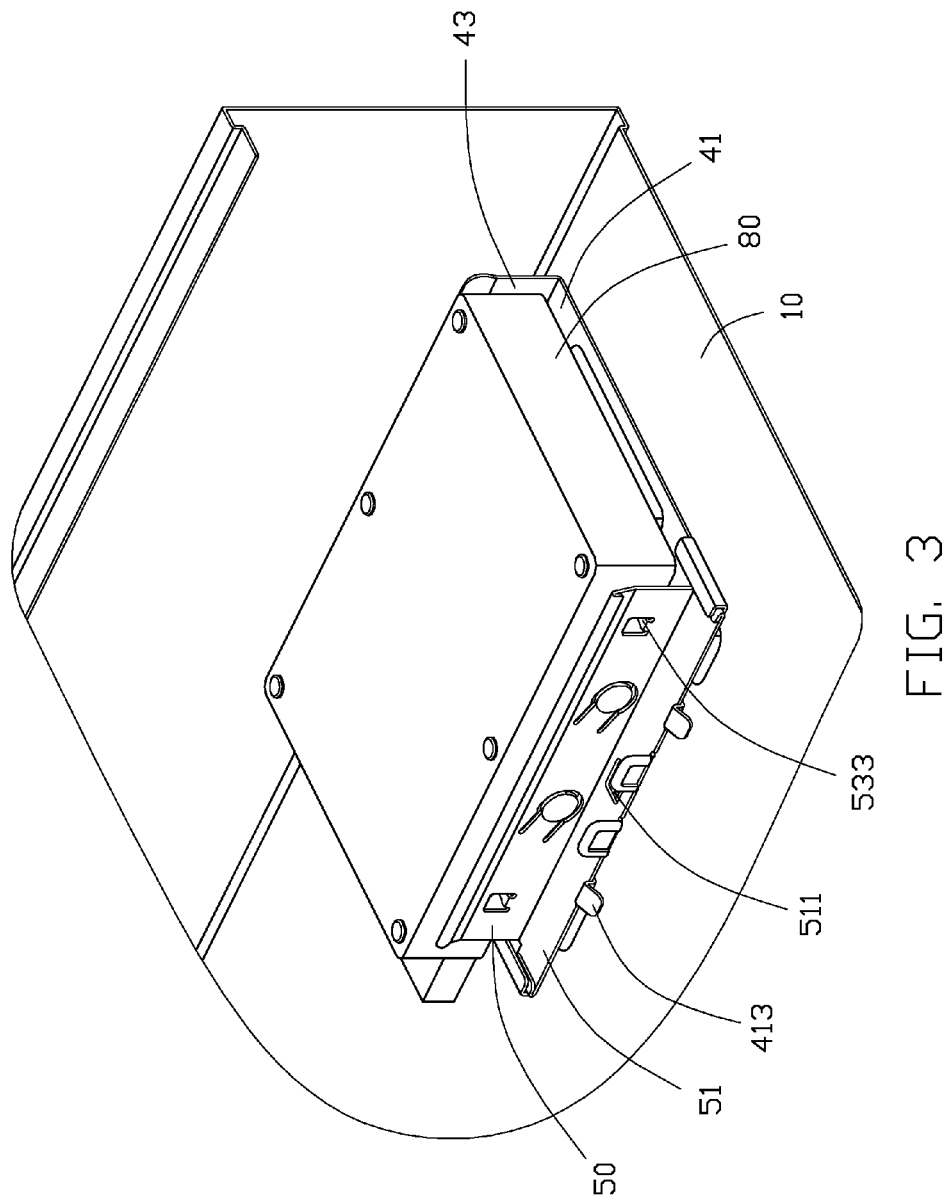
FIG. 3 is an assembled view of FIG. 1.
Figure 4:
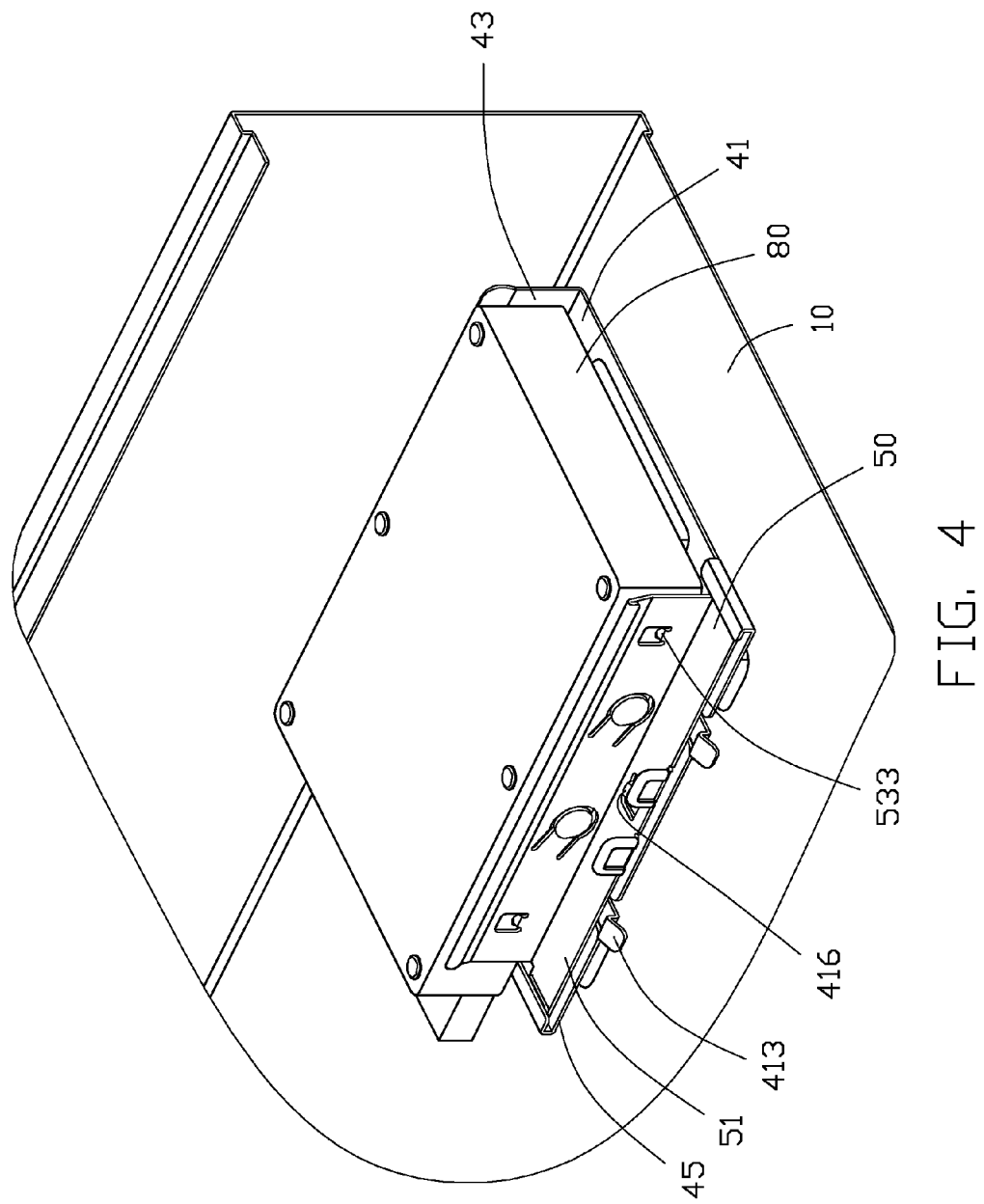
FIG. 4 is similar to FIG. 3, but the data storage device is in a locked position.

Referring also to FIG. 3 and FIG. 4, when securing the data storage device 80, the retaining member 50 is pulled away from the side wall 43 to allow easy insertion of the data storage device 80 into the space. The data storage device 80 is positioned in the receiving member 40 with the two fixing pins 433 engaged in the corresponding retaining holes 81 in one side thereof and the fixing pins 533 aligned with the corresponding retaining holes 81 in the opposite side thereof. The data storage device 80 is positioned in a release position. Then the retaining member 50 is slid to the data storage device 80 until the retaining wall 53 contacts with the lugs 418, and the fixing pins 533 are secured in the corresponding retaining holes 81 of the data storage device 80. The base wall 51 abuts the protrusion 416 elastically deforming the elastic clip 415 of the receiving member 40. When the fixing pins 533 are totally received in the corresponding retaining holes 81, the base opening 511 aligns with the protrusion 416 and the base wall 51 therefore engages with the protrusion 416. The elastic clip 415 rebounds and the protrusion 416 is engaged in the base opening 511 of the retaining member 50. The data storage device 80 is thus in a locked position.

When disassembling the data storage device 80, the protrusion 416 is pressed down to disengage from the base opening 511 of the retaining member 50. Then the retaining member 50 is drove to move away from the data storage device 80. The fixing pins 533 disengage from the corresponding holes 81 of the data storage device 80. The data storage device 80 is then positioned in the release position where the data storage device 80 can be easily removed from the receiving member 40.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting device for a data storage device, the data storage device having at least one retaining hole defined in each of two opposite sides thereof, the mounting device comprising:
   a receiving member for receiving the data storage device, the receiving member comprising a side wall configured for abutting one of the two opposite sides of the data storage device, and a bottom wall, at least one fixing pin formed on the side wall configured for inserting into the at least one retaining hole defined in the one of the two opposite sides of the data storage device, an elastic clip formed on the bottom wall with a protrusion thereon; and
   a retaining member slidably attached to the receiving member, the retaining member comprising a base wall and a retaining wall configured for abutting the other one of the two opposite sides of the data storage device, the base wall abutting on the bottom wall of the receiving member with the elastic clip extending thereunder, at least one fixing pin formed on the retaining wall configured for being received in the at least one retaining hole defined in the other one of the two opposite sides of the data storage device, an opening defined in the base wall engaged with the protrusion for mounting the data storage device via the at least one fixing pin of the retaining wall received in the at least one retaining hole defined in the other one of the two opposite sides of the data storage device.

2. The mounting device as described in claim 1, wherein two U-shaped directing portions are formed at opposite sides of the bottom wall respectively, and the base wall of the retaining member has two bent-over sliding flanges to slide into the corresponding directing portions.

3. The mounting device as described in claim 1, wherein at least one tongue is formed on a free edge of the bottom wall opposing the side wall to restrict movement of the retaining member away from the side wall.

4. The mounting device as described in claim 1, wherein at least two positioning structures are formed up on the bottom wall for supporting the data storage device, thereby keeping a distance between the bottom wall and the data storage device.

5. The mounting device as described in claim 1, wherein at least one wall tab is formed on the retaining wall of the retaining member for providing grounding contact with the data storage device.

6. The mounting device as described in claim 1, wherein the size of the opening is larger than the protrusion.

7. A mounting device for a data storage device, comprising:
   a receiving member configured for receiving the data storage device, the receiving member comprising a side wall and a bottom wall, the bottom wall has a free edge opposite to the side wall, a resilient stop portion being formed at the free edge, an elastic clip formed on the bottom wall with a protrusion thereon, the elastic clip being resilient in a direction perpendicular to the bottom wall; and
   a retaining member slidably riding over the resilient stop portion to be attached to the receiving member for fixing the data storage device to the receiving member, an opening being defined in the retaining member and engagingly receiving the protrusion therein, wherein when the protrusion is depressed to disengage from the opening of the retaining member, the retaining member can be moved away from the side wall of the receiving member to the stop portion for releasing the data storage device.

8. The mounting device as described in claim 7, wherein at least one retaining portion is formed on the side wall, the retaining portion and the retaining wall acting for cooperatively mounting the data storage device.

9. The mounting device as described in claim 7, wherein two U-shaped directing portions are formed at opposite sides of the bottom wall respectively, and a base wall of the retaining member has two opposite end portions bent rolled back to form sliding flanges to slide into the directing portions.

10. The mounting device as described in claim 7, wherein at least one elastic tongue at which the stop portion is formed is formed on the free edge of the bottom wall to restrict movement of the retaining member away from the receiving member.

11. The mounting device as described in claim 10, wherein the stop portion has a slant face for guiding the retaining member and a vertical face configured for abutting against the retaining member to prevent the retaining member moving off from the receiving member.

12. The mounting device as described in claim 7, wherein at least two positioning bars are formed up on the bottom wall for supporting the data storage device, thereby keeping a distance between the bottom wall and the data storage device.

13. The mounting device as described in claim 7, wherein at least one wall tab is formed on the retaining wall of the retaining member for providing grounding contact with the data storage device.

14. A mounting device assembly comprising:
a receiving member comprising a bottom wall and a side wall extending from the bottom wall, an elastic clip being formed at the bottom wall and being resilient in an up-and-down direction, a stop portion being formed at the bottom wall opposing to the side wall;
a retaining member slidably attached to the receiving member and engagable with the elastic clip in a left-and-right direction, the retaining member comprising a base wall slidably attached to the bottom wall of the receiving member and a retaining wall parallel to the side wall extending from the base wall; and
a data storage device located on the bottom wall and sandwiched between the side wall and the retaining wall, wherein the retaining member is slidable relative to the receiving member in the left-and-right direction between a locked position where the retaining member is locked with the elastic clip and the retaining member firmly holds the data storage device in place and a released position where the retaining member is disengaged from the elastic clip and moved away from the data storage device thereby releasing the data storage device, at the released position the retaining member being blocked by the stop portion for preventing the retaining member moving off from the receiving member.

15. The mounting device assembly as described in claim 14, wherein a plurality of holes is defined in opposite sides of the data storage device and a plurality of retaining pins is formed in the side wall and the retaining wall and inserted into the respective holes for retaining the data storage device to the receiving member in a front-and-back direction and the up-and-down direction at the locked position.

16. The mounting device assembly as described in claim 14, wherein the receiving member further comprises an elastic tongue with a stop portion formed at a free end thereof, the stop portion having a slant face for guiding the retaining member to be slidably attached to the receiving member and a vertical face abutting the retaining member at the release position for preventing the retaining member moving off from the receiving member.

17. The mounting device assembly as described in claim 14, further comprising a chassis, wherein the chassis has at least one platform configured for supporting the bottom wall of the receiving member thereon and at least one locking portion, and a T-shaped opening having a wide portion and a narrow portion is defined in the bottom wall, the at least one locking portion being extending through the wide portion of the T-shaped opening to lock with the narrow portion.

18. The mounting device assembly as described in claim 14, wherein the base wall of the retaining member defines an opening and the elastic clip has a protrusion formed at one end thereof, the protrusion being catched by one edge of the opening in the left-and-right direction and being slidable in the opening in the up-and-down direction at the locked position.

19. The mounting device assembly as described in claim 14, wherein at least one resilient wall tab is formed on the retaining wall of the retaining member for providing grounding contact with the data storage device.

20. The mounting device assembly as described in claim 14, wherein a lug extends upward from the bottom wall of the receiving member and is spaced from the stop portion in the left-and-right direction, the lug abutting on an inner side of the retaining member at the locked position.

* * * * *